United States Patent
Mohaupt et al.

(10) Patent No.: US 10,187,892 B2
(45) Date of Patent: Jan. 22, 2019

(54) APPARATUS, METHOD, AND COMPUTER PROGRAM FOR FREQUENCY BAND SELECTION

(71) Applicant: VOLKSWAGEN AG, Wolfsburg (DE)

(72) Inventors: Matthias Mohaupt, Bochum (DE); Sascha Jurthe, Hattingen (DE)

(73) Assignee: Volkswagen AG (DE)

( * ) Notice: Subject to any disclaimer, the term of this patent is extended or adjusted under 35 U.S.C. 154(b) by 63 days.

(21) Appl. No.: 15/349,319

(22) Filed: Nov. 11, 2016

(65) Prior Publication Data

US 2017/0142724 A1    May 18, 2017

(30) Foreign Application Priority Data

Nov. 12, 2015  (DE) .................. 10 2015 222 308

(51) Int. Cl.
| | |
|---|---|
| *H04W 52/50* | (2009.01) |
| *H04W 72/04* | (2009.01) |
| *H04B 1/3822* | (2015.01) |
| *H04W 16/08* | (2009.01) |
| *H04W 52/32* | (2009.01) |
| *H04W 84/12* | (2009.01) |

(52) U.S. Cl.
CPC ...... *H04W 72/0453* (2013.01); *H04B 1/3822* (2013.01); *H04W 16/08* (2013.01); *H04W 52/325* (2013.01); *H04W 52/50* (2013.01); *H04W 84/12* (2013.01)

(58) Field of Classification Search
CPC ........... H04W 72/0453; H04W 76/021; H04W 84/12

See application file for complete search history.

(56) References Cited

U.S. PATENT DOCUMENTS

| | | | |
|---|---|---|---|
| 2005/0250528 A1 | 11/2005 | Song et al. | |
| 2007/0182643 A1 | 8/2007 | Li et al. | |
| 2007/0274275 A1* | 11/2007 | Laroia | H04L 5/0035 370/338 |
| 2008/0075059 A1* | 3/2008 | Kermoal | H04W 16/14 370/343 |

(Continued)

OTHER PUBLICATIONS

Arnold; Decision Making: C't Magazine for Computer Technology; 2012; Issue 24; pp. 196-198.

(Continued)

*Primary Examiner* — Chi Ho A Lee
*Assistant Examiner* — Andrew Lee
(74) *Attorney, Agent, or Firm* — Barnes & Thornburg LLP

(57) ABSTRACT

Apparatuses and methods for influencing the selection of a frequency band for wireless communication with a mobile station. The apparatus includes a transmission circuit that sends a beacon signal at a first transmission power in the frequency band. The apparatus also includes a recognition circuit that recognizes a connection request from a mobile station in the frequency band. The apparatus also includes a control circuit that responds to the connection request by prompting a transmission of the beacon signal at a second transmission power, which is different than the first transmission power, if the mobile station is unknown to the apparatus. Also disclosed are corresponding methods and computer programs.

17 Claims, 2 Drawing Sheets

(56) References Cited

U.S. PATENT DOCUMENTS

| | | | |
|---|---|---|---|
| 2011/0194532 A1* | 8/2011 | Kakkad | H04W 36/30 |
| | | | 370/331 |
| 2012/0224483 A1 | 9/2012 | Babiarz et al. | |
| 2012/0275320 A1 | 11/2012 | Iyer | |
| 2012/0300759 A1 | 11/2012 | Patanapongpibul et al. | |
| 2013/0143499 A1* | 6/2013 | Ando | H04W 4/021 |
| | | | 455/41.2 |
| 2013/0155949 A1 | 6/2013 | Pochop, Jr. et al. | |
| 2014/0370904 A1* | 12/2014 | Smith | H04W 8/005 |
| | | | 455/450 |
| 2015/0295802 A1* | 10/2015 | Balakrishnan | H04L 43/0811 |
| | | | 370/248 |
| 2015/0304822 A1* | 10/2015 | Han | H04W 4/06 |
| | | | 370/311 |
| 2016/0050567 A1* | 2/2016 | Asano | H04W 12/08 |
| | | | 726/1 |
| 2016/0255570 A1* | 9/2016 | Fang | H04W 48/12 |
| | | | 370/338 |
| 2016/0338059 A1* | 11/2016 | Huang | H04W 24/02 |
| 2017/0215140 A1* | 7/2017 | Stupar | H04W 48/20 |
| 2017/0359785 A1* | 12/2017 | Sawai | H04W 16/14 |

OTHER PUBLICATIONS

LANCOM Systems; LANCOM(tm) Techpaper WLAN Band Steering; 2012.
Search Report from German Patent Application No. 10 2015 222 308.6; dated Apr. 13, 2016.

* cited by examiner

APPARATUS, METHOD, AND COMPUTER PROGRAM FOR FREQUENCY BAND SELECTION

PRIORITY CLAIM

This patent application claims priority to German Patent Application No. 10 2015 222 308.6, filed 12 Nov. 2015, the disclosure of which is incorporated herein by reference in its entirety.

SUMMARY

Exemplary embodiments relate to the control of a frequency band selection and to the control of the frequency band selection for existing devices, where they govern at least two frequency bands. This control may also be fitted in motor vehicles.

BRIEF DESCRIPTION OF THE DRAWINGS

Some exemplary embodiments are explained in more detail below with reference to the accompanying figures, in which.

DETAILED DESCRIPTION

Figure 1:
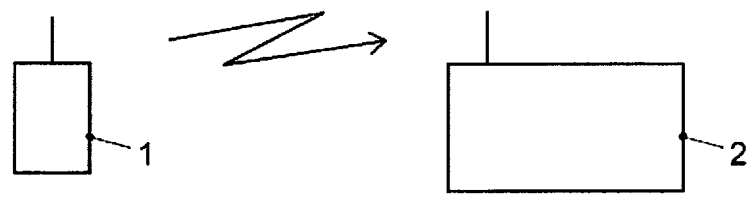
FIG. 1 shows a schematic diagram of a WLAN arrangement with a mobile station and a base station.

Wireless networks—called wireless local area networks, WLAN—can also be provided inside vehicles. Such networks can be set up between mobile stations and base stations as subscribing stations, base stations being able to be permanently installed in vehicles. In the present case, base stations are also referred to as apparatuses. Customary frequency bands for such WLAN networks are 2.4 GHz and 5 GHz. For efficient operation of the WLAN networks, it appears beneficial to allocate specific frequency bands to subscribing stations. This allows efficient use of the existent radio spectrum and of the available bandwidth to be achieved. For the purpose of simple usability, it appears beneficial to use the same service group identification number—Service Set Identification (SSID)—in both cited frequency bands, so that they appear as a single network to the user. The choice of frequency band is allocated to the mobile station in the WLAN standard. For this reason, the base station has only limited influence on this selection.

Arnold, A.; Entscheidungshilfe; c't Magazin für Computer Technik, No 24, pp. 196-198, 2012, teaches client control for better load distribution in WLANs using situation-dependent probe response commands from the access points.

US 2007/182643 A1 teaches an antenna system comprising a first, a second and a third antenna, which are arranged on a printed circuit board (PCB). These comprise an arcuate element having a concave side and a convex side and a conductive element that extends essentially radially from the center of the concave side.

LANCOM Systems: Techpaper WLAN Band Steering. 2012—Company publication teaches benefits of band steering such as rising transmission rate for 5 GHz clients and also the principles of operation and configuration options for LANCOM Access Points.

US 2012/224483 A1 teaches the provision of good quality of service (QoS), appropriate service level agreements (SLAs) and loadable connection of wireless devices at good signal strength, a good signal-to-noise-and-interference ratio (SNIR) and sufficiently usable bandwidth. This requires the devices to ensure bandwidth-effective reception of data packets through the air and to be able to overcome bottlenecks in the air interface.

US 2012/275320 A1 teaches signal strength dependent band control. It shows a system and a method that receives a current requirement by a client and responds by taking into consideration the signal strength of the previous request.

US 2013/155949 A1 teaches a method and an apparatus for equalizing band performance. The apparatus is designed to communicate with various wireless devices and comprises two antennas for different frequency bands. The signal strength in the first frequency band is higher than the signal strength in the second frequency band.

US 2012/300759 A1 teaches support for an operative band in a wireless local area network (WLAN). A relative priority of a frequency band is provided to instruct a WLAN device to select a preferred frequency band.

US 2005/250528 A1 teaches a system for a wireless network based on transmission power control and a method for controlling transmission power. In this case, new stations that arise can easily acquaint themselves with a base station and communicate via the base station.

Known base station control methods for giving preference to one frequency band alter the response of the base station in relation to the mobile stations. As such, messages for confirming association from the base station for the mobile station can be slowed down, or not sent in the first place, by the base station installed in the vehicle, for example, if the mobile station desires association on the unpreferred frequency band. On the preferred frequency band, on the other hand, the relevant confirmation can be sent immediately by the base station. However, such methods are unreliable and dependent on the respective circumstances, the environment and implementations of the devices. Further, the performance of the respective band is at least temporarily reduced.

It would, therefore, be desirable to offer alternative selection options that influence the selection of frequency bands without changing the WLAN standard when there are mobile stations with the opportunity to use multiple frequency bands.

The core concept of the disclosed embodiments is influencing the frequency band selection of the mobile stations by rendering the unpreferred frequency band "invisible". Hence, the mobile station automatically switches to other, visible frequency bands, insofar as they are governed by it.

Exemplary embodiments provide an apparatus for influencing the selection of a frequency band for wireless communication with a mobile station. The apparatus comprises a transmission circuit that is designed to send a beacon signal at a first transmission power in the frequency band. Further, the apparatus comprises a recognition circuit that is designed to recognize a connection request from a mobile station in the frequency band. Finally, the apparatus comprises a control circuit that is designed to respond to the connection request by prompting a transmission of the beacon signal at a second transmission power, which is different than the first transmission power, if the mobile station is unknown to the apparatus. Hence, it is possible to achieve the effect of influencing the frequency band selection for all mobile stations that support at least two frequency bands.

Optionally, the control circuit may further be designed to set the second transmission power lower than the first transmission power. This supports the selection effect while at the same time saving the radio resources of the unpreferred frequency band.

In some exemplary embodiments, the control circuit may further be designed to maintain the second transmission power for a prescribed time and subsequently to prompt the first transmission power again. This reduces the association capability of the unpreferred frequency band only temporarily.

In some disclosed embodiments, the control circuit may further be designed to respond to the connection request by a mobile station that is known to the apparatus in the frequency band by maintaining the first transmission power. This supports association with the unpreferred frequency band when an association attempt by the mobile station using the preferred frequency band has failed.

Optionally, the control circuit may further be designed to respond to the connection request from an unknown mobile station in the frequency band by storing an individual terminal identifier in the apparatus. This allows a repeated association attempt by the mobile station in the frequency band to be recognized.

In some exemplary embodiments, the control circuit may further be designed to respond to each connection request in the frequency band by checking whether the individual terminal identifier is stored. This allows a further association attempt by the mobile station in this frequency band to be facilitated.

In some disclosed embodiments, the control circuit may further be designed to follow termination of a connection or to follow expiry of a further prescribed time by erasing the individual terminal identifier. This allows a later association attempt to prompt fresh influencing of the choice of frequency band by the mobile station to be achieved.

Optionally, the transmission circuit may further be designed to arrange the frequency band at 2.4 GHz and a further frequency band at 5 GHz and/or to form it as a wireless local area network—WLAN—frequency band. This allows an association with the base station to be made possible for a large number of standardized mobile stations.

In some exemplary embodiments, the apparatus may furthermore comprise a transmission circuit that is designed to send a beacon signal in a further frequency band at a transmission power specific to the further frequency band. Further, the apparatus can comprise a recognition circuit that is designed to recognize the connection request from a mobile station in the further frequency band. Furthermore, the apparatus can comprise a control circuit that is designed to confirm the connection request from the mobile station. This allows association of the mobile station on the preferred frequency band to be made possible.

Optionally, a motor vehicle may be equipped with apparatus according to at least one of the cited exemplary embodiments, the apparatus being arranged such that the whole interior of the motor vehicle is available for spatial positioning of the mobile station for a communication with the apparatus.

In some exemplary embodiments, a method for influencing the selection of a frequency band for wireless communication by an apparatus with a mobile station is used. The method comprises the sending of a beacon signal at a first transmission power in the frequency band. Further, the method comprises the recognition of a connection request from a mobile station in the frequency band and the transmission of the beacon signal at a second transmission power, which is different than the first transmission power, if the mobile station is unknown to the apparatus. This allows the effect of influencing the frequency band selection for all mobile stations that support at least two frequency bands to be achieved.

In some disclosed embodiments, a method can be used in which a connection request from an unknown mobile station in the frequency band is rejected. This allows a first connection request in the unpreferred frequency band to be rejected.

Optionally, a method can be used in which a beacon signal is sent in a further frequency band and the connection request from the mobile station in the further frequency band is confirmed. This allows the preferred frequency band to be used.

In some exemplary embodiments, a method can be used in which the second transmission power in the frequency band is maintained for a prescribed time and subsequently the first transmission power is again used for sending. This allows the reduced availability for connection setup in the frequency band to be limited in terms of time.

In some disclosed embodiments, a method can be used in which a connection request from an unknown mobile station in the frequency band prompts an individual terminal identifier to be stored to announce the mobile station. This allows identification of whether there is a repeated connection attempt by the mobile station in this frequency band.

Optionally, a method can be used in which the connection request in the frequency band by a known mobile station prompts the connection request from the mobile station to be confirmed. This allows a connection between mobile station and base station when the use of the preferred frequency band has failed.

In some exemplary embodiments, a computer program for performing at least one operation of the aforementioned method can be used, wherein the computer program runs on a programmable hardware component.

In some disclosed embodiments, an apparatus can control a frequency band selection for wireless communication with a mobile station in a wireless local area network—WLAN—in which at least a first and a second frequency band are selectable, the first and second frequency bands each comprising a multiplicity of transmission channels. The apparatus comprises a transmission circuit for transmitting at least one command to the mobile station that asks the mobile station to change from the first to the second frequency band, or vice versa. It is possible to bring about reliable changeover in compatible devices.

Optionally, the apparatus may comprise a provision circuit for providing results, ascertained prior to the change from the first to the second frequency band, or vice versa, of an authentication and/or an association between the mobile station and the apparatus and/or of a dynamic host configuration protocol—DHCP—procedure between the mobile station and the apparatus, which continue to be used after the change from the first to the second frequency band, or vice versa. This allows the effect of saving the radio resources to be achieved.

In some exemplary embodiments, the apparatus may comprise a control circuit for arranging media access control—MAC—between the mobile station and the apparatus after the change from the first to the second frequency band, or vice versa. Reference may be made to the existing IEEE 802.11 standard.

In some disclosed embodiments, the apparatus may comprise a two-way circuit for maintaining the arranged association between the apparatus and the mobile station when it is not possible to implement the change from the first to the second frequency band, or vice versa. This allows disassociation to be avoided.

In further disclosed embodiments, the mobile station corresponding with the apparatus may be equipped in accordance with the features of the apparatus. Further, corresponding methods can take place between the mobile station and the apparatus.

Optionally, it is also possible for disclosed embodiments of the first and further exemplary embodiments to be combined. As such, by way of example, it is possible for embodiments of frequency band selection by beacon lowering to adjoin embodiments of frequency band selection by command in the further course of the connection. This allows changed circumstances of an air interface between the stations over the course of time to be taken into account without termination of the connection becoming necessary.

Various exemplary embodiments will now be described in more detail with reference to the accompanying drawings, which represent some exemplary embodiments. In the figures, the thickness dimensions of lines, layers and/or regions may be represented in exaggerated form for the sake of clarity.

In the description of the appended figures below, which show only some exemplary embodiments, the same reference symbols can denote the same or comparable components. Further, combined reference symbols can be used for components and objects that occur repeatedly in an exemplary embodiment or in a drawing but are described together for one or more features. Components or objects that are described by the same or combined reference symbols may be embodied in the same way, but possibly also differently, for individual, multiple or all features, for example, the dimension thereof, unless the description explicitly or implicitly reveals otherwise.

Although exemplary embodiments can be modified and varied in different ways, exemplary embodiments are represented as examples in the figures and are described in detail here. However, it should be clarified that the intention is not to limit exemplary embodiments to the respectively disclosed forms, but rather that exemplary embodiments are instead intended to cover all functional and/or structural modifications, equivalents and alternatives that come within the scope of the disclosed embodiments. The same reference symbols denote the same or similar elements throughout the description of the figures.

The terminology that is used here serves only to describe exemplary embodiments and is not intended to limit the exemplary embodiments. As used here, the singular forms "a" and "the" are also intended to include the plural forms unless the context clearly indicates otherwise. Further, it should be clarified that expressions such as, e.g., "includes", "including", "has" and/or "having", as used here, indicate the presence of cited features, whole numbers, operations, workflows, elements and/or components, but do not exclude the presence or addition of one or more features, whole numbers, operations, workflows, elements, components and/or groups thereof.

Unless defined otherwise, all terms used here (including technical and scientific terms) have the same meaning as attributed to them by a person of average skill in the art in the field to which the exemplary embodiments belong. Further, it should be clarified that expressions, e.g., those that are defined in generally used dictionaries, should be interpreted as though they had the meaning that is consistent with their meaning in the context of the relevant art, and should not be interpreted in an idealized or excessively formal sense, unless this is expressly defined here.

FIG. 1 shows a schematic diagram of a WLAN arrangement with a mobile station and a base station. The two devices are connected by an air interface in accordance with the cited WLAN standard. This standard is also referred to as the IEEE 802.11 standard, of which there are various expansion levels with different performance characteristics. Devices that correspond to one of these expansion levels can communicate with all other partner devices of the same expansion level without the need for separate matching of the devices to one another. Further, the standard is distinguished by direct communication by the two devices with one another and thus avoids the interposition of switching centers or the like. As such, the mobile station 1 can interchange data directly with the base station 2. In this case, the base station 2 transmits an identification signal, what is known as a beacon, that identifies it and communicates its properties. When a mobile station 1 spots a suitable beacon, it can set up a connection to the base station 2 using appropriate protocol elements.

Figure 2:
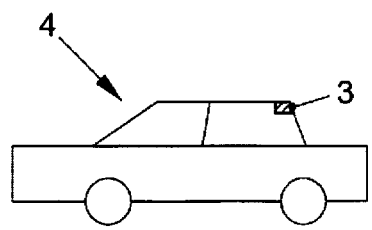
FIG. 2 shows a possible arrangement of a WLAN base station in an automobile.

FIG. 2 shows a possible arrangement of a WLAN base station 3 in an automobile 4. Base stations of the WLAN standard are usually installed at a fixed location. This installation is geared to need and may be devoted to both private and public traffic. In the disclosed embodiments, the base station is arranged in a motor vehicle, which can cover all common types such as automobile, truck, etc. This arrangement may be embodied either as a fixed installation or as a temporary installation and also covers the possibility of ex-works fitting by the motor vehicle manufacturer. By way of example, the installation of the base station can be installed in the rear view mirror or in the console or in a manner connected to an interior lighting device. In this case, the base station is arranged such that essentially the whole interior of the motor vehicle is available for spatial positioning of the mobile station and there is then the possibility of a good connection quality for connections to the base station. Optionally, it is also possible for a connection close to the motor vehicle to be covered as well.

Figure 3:
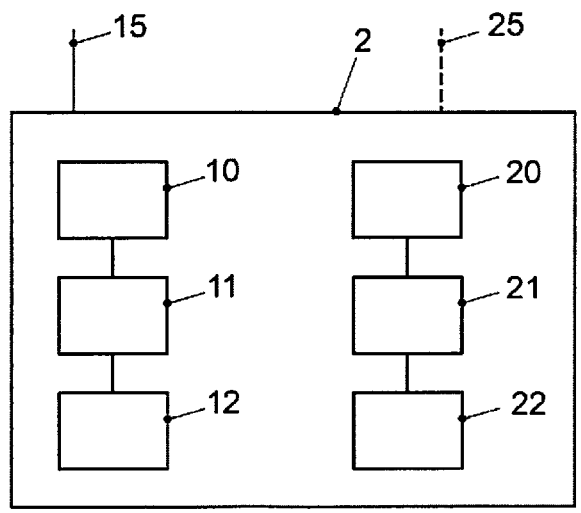
FIG. 3 shows a schematic diagram of a WLAN base station.

FIG. 3 shows a schematic diagram of a WLAN base station 2. In this case, the base station shown comprises means for WLAN standard compliant communication via two frequency bands, the 2.4 GHz band and the 5 GHz band. The latter was only added in a later version of the standard. Accordingly, there are mobile stations that can communicate only in the 2.4 GHz band. More recent mobile stations can communicate in both bands. The 5 GHz band has a distinctly increased channel bandwidth and higher-quality modulation technology. Accordingly, the channel capacity in this frequency band is much higher in comparison with the 2.4 GHz frequency band. For this reason, it is beneficial to put data traffic onto the 5 GHz band where possible. This keeps the 2.4 GHz band free for older mobile stations too, inter alia.

The base station 2 can communicate on both frequency bands. It has a design that is symmetrical for both frequency bands. As such, the elements for the 2.4 GHz band comprise a transmission circuit 10, a recognition circuit 11 and a control circuit 12. The transmission circuit 10 is connected to a transmission/reception antenna 15 and designed to send a power of up to 20 dBm (100 mW) EIRP (equivalent isotropically radiated power). Since the antenna can be assumed to have high directivity, which can also be understood to mean the orientation of the effective direction of an antenna, in the vehicle, the power supplied to the antenna is typically approximately 14 dBm (25 mW). As already explained, this beacon signal is used by the mobile stations 1 to recognize the presence of a base station 2 and, at the same time, comprises various information from the base station 2, for example, network name ("Service Set Identifier", SSID), list of supported transmission rates and/or the type of encryption. In this case, the first transmission power is set such that mobile stations 1 that recognize the signal can interchange data with the base station 2 with what is expected to be sufficient quality. Further, the transmission circuit is designed to transmit a beacon signal at reduced transmission power. In this case, a distinct lowering may be possible, for example, by 20 dB. Alternatively, smaller or larger lowerings can be set, which may be dependent, inter alia, on the installation location in the vehicle, which can also be understood as the location provided for arranging a base station in the interior of the vehicle, or on other environmental parameters. A beacon having this reduced transmission power is no longer able to be detected by many mobile stations 1. Accordingly, the mobile station 1 will not make a connection setup attempt or an association attempt on this frequency band, but will instead turn to other frequency bands where possible. The transmission circuit 10 is connected to the recognition circuit 11. This recognizes a connection request from a mobile station 1 on the base station 2 in the allocated 2.4 GHz frequency band. The connection circuit 10, for its part, is also connected to the control circuit 12. This has the task of controlling the transmission power of the beacon signal, inter alia. For this, it establishes whether the mobile station 1 currently making a request by association request is still unknown to the base station 2. In this case, it instructs the transmission circuit 10 to significantly reduce the transmission power of the beacon signal. If the requesting mobile station 1 is already known to the base station 2, however, then the control circuit 10 dispenses with reproducing the transmission power of the beacon signal.

For the 5 GHz band, there are corresponding means in the base station 2 having essentially similar functions to transmission circuit 20, recognition circuit 21 and control circuit 22. However, the circuits of the 5 GHz band are not equipped with the power lowering function for the beacon signal, since the 5 GHz frequency band is the preferred frequency band. Accordingly, the transmission circuit 20 exhibits no reduction function for the transmission power of the beacon signal and the control circuit 22 exhibits no corresponding transmission power control. The transmission circuit 20 may be connected to a separate antenna 25. Alternatively, it is also possible for both transmission circuits 10 and 20 to be connected to both antennas 15 and 25.

Figure 4:
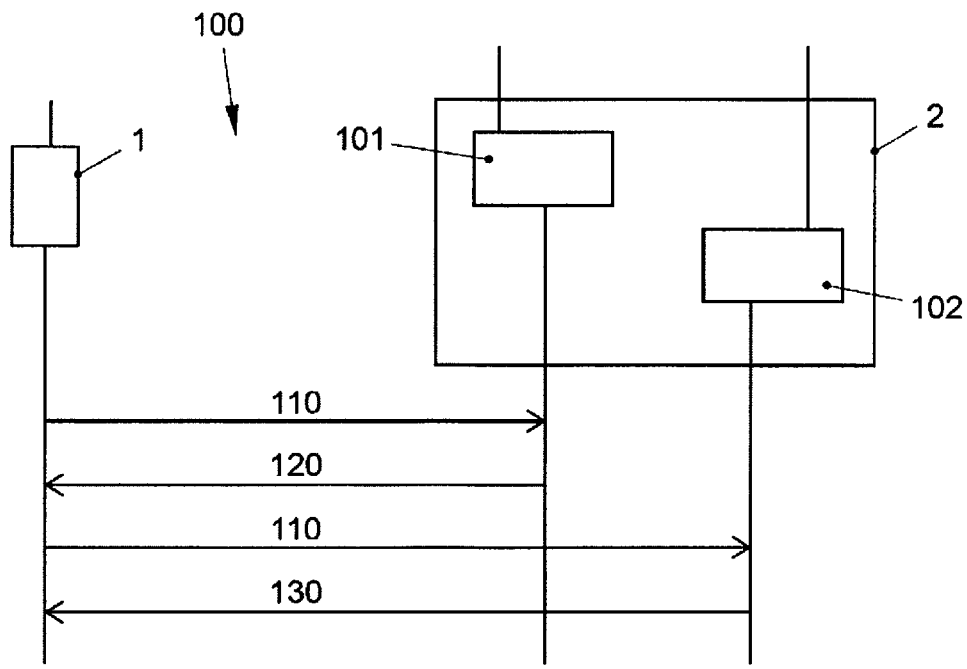
FIG. 4 shows a first example of a signaling sequence.

FIG. 4 shows a first example of a signaling sequence between a mobile station 1 and a base station 2 in a WLAN system 100. In this case, the base station 2 comprises a 2.4 GHz circuit block 101, which can comprise the circuits 10-12 from FIG. 3, for example. Further, the base station 2 comprises a 5 GHz circuit block 102, which can comprise the circuits 20-22 from FIG. 3, for example. By way of example, the circuit blocks 101 and 102 are connected to respective separate antennas.

The circuit blocks for 2.4 GHz 101 and 5 GHz 102 each transmit a beacon signal at the power prescribed for each in the standard. At least the 2.4 GHz beacon signal is detected by the mobile station 1 that wishes to set up a connection to the base station 2. The mobile station 1 then sends an association request 110 in the 2.4 GHz band to the base station 2. In the circuit block 101, a check is then performed to determine whether an identifier for this mobile station is already stored in the base station 2 (not shown). This identifier may be a media access control address—MAC address—in the WLAN standard. If the identifier is not stored, then the association request from the mobile station 1 is rejected and an appropriate report, which may be an association response: NOK 120, for example, is returned. Further, the identifier of the mobile station 1 is stored in the base station 2. Furthermore, the transmission power of the beacon signal for 2.4 GHz is lowered. The mobile station 1 is additionally equipped with the 5 GHz frequency band and receives the appropriate beacon signal on this frequency. The mobile station 1 then sends an association request 110 in the 5 GHz band to the base station 2. The circuit block 102 accepts the association request and prompts transmission of an appropriate report 130, the association response: OK. This means that the mobile station 1 has been associated with the base station 2 and user data can be interchanged.

Figure 5:
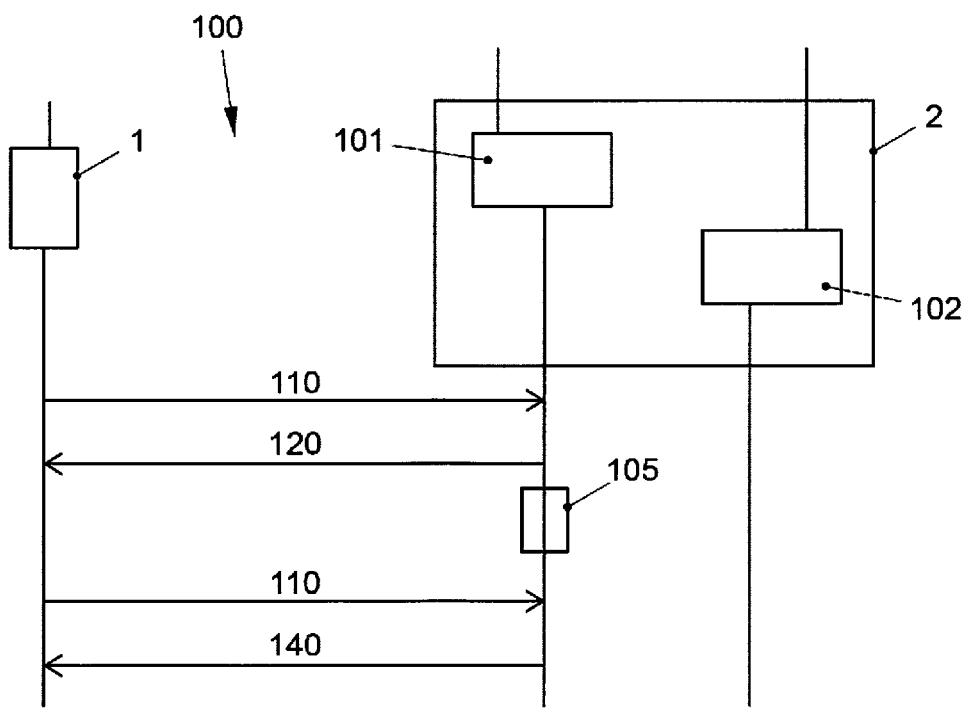
FIG. 5 shows a second example of a signaling sequence.

FIG. 5 shows the arrangement from FIG. 4 for another exemplary embodiment. The top process 110 (association request) and the negative response 120 (association response: NOK) correspond to the processes in the FIG. 4 description. The identification storage (not shown) in the base station 2 also takes place. However, in this exemplary embodiment, the mobile station 1 is not able to use the 5 GHz band. Alternatively, the mobile station 1 may also not be able to receive the 5 GHz beacon. The same applies to the 2.4 GHz beacon, the transmission power of which has been lowered. Accordingly, no connection is possible at this time. After a prescribed time of typically three seconds, the circuit block 101 switches the transmission power of the beacon signal at 2.4 GHz back to the nominal power in the process 105. The time after which the power is reset again may also be shorter if the scan times of the mobile stations are reduced by technological improvements. The mobile station 1 then recognizes the 2.4 GHz beacon and attempts to associate with the base station 2 again. In this case, the circuit block 101 already knows the identifier of the mobile station 1 and now accepts the association request from the mobile station 1. Accordingly, the base station 1 returns an association response: OK 140. It is now possible for a data interchange to take place between mobile station 1 and base station 2 in the 2.4 GHz band.

After the connection has concluded or after a prescribed time has elapsed with unsuccessful connection setup, the identifier of the mobile station 1 is erased in the base station 2 again. Hence, the initial conditions are restored for later connection setup attempts.

In further disclosed embodiments, the beacon signal can be lowered to a transmission power that the mobile station is no longer able to perceive, or alternatively even switched off completely, for the prescribed time.

The disclosed embodiments can be summarized as follows. Studies with various mobile stations have shown that rudimentary band control can be achieved by adapting the signal strength in the 2.4 and 5 GHz bands. If the 5 GHz band uses a much higher power than its 2.4 GHz counterpart, then the mobile stations connect much more often in the 5 GHz band than in the 2.4 GHz band. Laboratory tests with an ordinary base station have revealed that the power difference in the transmission power should be at least 14 dBm. So as not to impair normal handling, only the beacons and the probe response frames have their transmission power reduced.

WLAN supply in the vehicle interior is intended to be provided both by the 5 GHz band and by the 2.4 GHz band. Since the capacity in the 5 GHz band is distinctly higher (as a result of channel bandwidth and higher-quality modulation technology), it is desirable if the terminals connect to the 5 GHz WLAN—when available on the terminal. It is proposed that the power of the 2.4 GHz beacons be lowered to feign better network quality for the 5 GHz network.

In a further disclosed embodiment, frequency band change commands can be used to initiate a change of frequency band. These frequency band change commands can follow the standardized methods of the WLAN standard IEEE 802.11-2012 for channel changes, for example, in which an access point, also called a base station in this description, stipulates the change of channel for its clients, which may be implemented in mobile stations. This is necessary for fast frequency selection (Dynamic Frequency Selection—DFS—), in which clearance of a channel becomes necessary, for example, when radar interference is detected on the channel. Such channel change commands may be possible within the frequency bands (5 GHz and/or 2.4 GHz).

Frequency bands can be changed by using a frequency band change command. In contrast to a channel change command, it is not sufficient in the case of a frequency band change just to send an appropriate frequency band change command from the base station to the mobile station. Additionally, it should be borne in mind that it is necessary to change from one media access control—MAC—(for example, for 2.4 GHz) to another MAC (for example, for 5 GHz/GO). Further, it should be taken into consideration that the change of frequency band takes place seamlessly. A seamless transition of this kind avoids a new authentication and/or an interruption to the connection and/or a dynamic host configuration procedure (Dynamic Host Configuration Protocol—DHCP—) in the new frequency band, for example. If the mobile station does not support the new frequency band (for example, the 5 GHz frequency band), then a band change procedure could ensure that the connection of the mobile station is not severed completely from the network, but rather that the connection can remain in the previous frequency band (for example, in the 2.4 GHz frequency band).

The features disclosed in the description above, the claims below and the appended figures can be of importance and implemented either individually or in any combination for realizing an exemplary embodiment in their various refinements.

Although some embodiments have been described within the context of an apparatus, it goes without saying that these embodiments also represent a description of the corresponding method, which means that a block or a component of an apparatus can also be understood as a corresponding method operation or as a feature of a method operation. Similarly, embodiments that have been described within the context of or as a method operation also represent a description of a corresponding block or detail or feature of a corresponding apparatus.

Depending on implementation requirements, exemplary embodiments may be implemented in hardware or in software. The implementation can be performed using a digital storage medium, for example, a floppy disk, a DVD, a Blu-Ray disc, a CD, a ROM, a PROM, an EPROM, an EEPROM or a FLASH memory, a hard disk or another magnetic or optical memory on which electronically readable control signals are stored that can interact or do interact with a programmable hardware component such that the respective method is performed.

A programmable hardware component can be formed by a processor, a computer processor (CPU=Central Processing Unit), a graphics processor (GPU=Graphics Processing Unit), a computer, a computer system, an application-specific integrated circuit (ASIC), an integrated circuit (IC), a system on chip (SOC), a programmable logic element or a field-programmable gate array (FPGA) with a microprocessor.

In general, exemplary embodiments may be implemented as a program, as firmware, as a computer program or computer program product with a product code or as data, the program code or the data being effective to perform one of the methods when the program runs on a processor or a programmable hardware component. The program code or the data may also be stored on a machine-readable medium or data storage medium, for example. The program code or the data may be present as source code, machine code or byte code, inter alia, and as other intermediate code.

A further exemplary embodiment is additionally a data stream, a signal train or a sequence of signals that represent(s) the program for performing one of the methods described here. By way of example, the data stream, the signal train or the sequence of signals may be configured to be transferred via a data communication link, for example, via the Internet or another network. Exemplary embodiments are thus also signal trains that represent data and are suitable for sending via a network or a data communication link, with the data representing the program.

The exemplary embodiments described above are merely an illustration. It goes without saying that modifications and variations of the arrangements and details described here will be evident to other persons skilled in the art. The intention is therefore that the disclosed embodiments will be limited only by the scope of protection of the patent claims that follow and not by the specific details that have been presented here on the basis of the description and the explanation of the exemplary embodiments.

The invention claimed is:

1. An apparatus for influencing the selection of a frequency band for wireless communication with a mobile station, the apparatus comprising:
   a transmission circuit to send a beacon signal at a first transmission power in the frequency band;
   a recognition circuit to recognize a connection request from a mobile station in the frequency band; and
   a control circuit to respond to the connection request by prompting a transmission of the beacon signal at a second transmission power, which is different than the first transmission power, if the mobile station is unknown to the apparatus,
   wherein the control circuit maintains the second transmission power for a prescribed time and subsequently prompts the first transmission power again.

2. The apparatus of claim 1, wherein the control circuit sets the second transmission power lower than the first transmission power.

3. The apparatus of claim 1, wherein the control circuit responds to the connection request by a mobile station that is known to the apparatus in the frequency band by maintaining the first transmission power and/or in that the control circuit responds to the connection request from an unknown mobile station in the frequency band by storing an individual terminal identifier in the apparatus.

4. The apparatus of claim 3, wherein the control circuit responds to each connection request in the frequency band by checking whether the individual terminal identifier is stored.

5. The apparatus of claim 4, wherein the control circuit follows termination of a connection or follows expiry of a further prescribed time by erasing the individual terminal identifier.

6. The apparatus of claim 1, wherein the transmission circuit arranges the frequency band at 2.4 GHz and a further frequency band at 5 GHz and/or forms the frequency band as a wireless local area network—WLAN—frequency band.

7. The apparatus of claim 4, wherein the control circuit follows termination of a connection or follows expiry of a further prescribed time by erasing the individual terminal identifier.

8. The apparatus of claim 1, wherein the transmission circuit arranges the frequency band at 2.4 GHz and a further frequency band at 5 GHz and/or forms the frequency band as a wireless local area network—WLAN—frequency band.

9. The apparatus of claim 1, further comprising:
a transmission circuit to send a beacon signal in the further frequency band at a transmission power specific to the further frequency band;
a recognition circuit to recognize the connection request from a mobile station in the further frequency band; and
a control circuit to confirm the connection request from the mobile station.

10. The apparatus of claim 1, further comprising:
a transmission circuit to send a beacon signal in the further frequency band at a transmission power specific to the further frequency band;
a recognition circuit to recognize the connection request from a mobile station in the further frequency band; and
a control circuit to confirm the connection request from the mobile station.

11. A motor vehicle having an apparatus for influencing the selection of a frequency band for wireless communication with a mobile station, the apparatus comprising:
a transmission circuit to send a beacon signal at a first transmission power in the frequency band;
a recognition circuit to recognize a connection request from a mobile station in the frequency band; and
a control circuit to respond to the connection request by prompting a transmission of the beacon signal at a second transmission power, which is different than the first transmission power, if the mobile station is unknown to the apparatus,
wherein the apparatus is arranged so the whole interior of the mobile vehicle is available for spatial positioning of the mobile station for a communication with the apparatus,
wherein the control circuit maintains the second transmission power for a prescribed time and subsequently prompts the first transmission power again.

12. The motor vehicle of claim 11, wherein the control circuit sets the second transmission power lower than the first transmission power.

13. A method for influencing the selection of a frequency band for wireless communication by an apparatus with a mobile station, the method comprising:
transmission of a beacon signal at a first transmission power in the frequency band;
recognition of a connection request from a mobile station in the frequency band; and
transmission of the beacon signal at a second transmission power, which is different than the first transmission power, in response to a determination that the mobile station is unknown to the apparatus,
wherein the second transmission power in the frequency band is maintained for a prescribed time and subsequently the first transmission power is again used for sending.

14. The method of claim 13, wherein the connection request from the unknown mobile station in the frequency band is rejected.

15. The method of claim 13, wherein a beacon signal is sent in a further frequency band and the connection request from the mobile station in the further frequency band is confirmed.

16. The method of claim 13, wherein the connection request from an unknown mobile station in the frequency band prompts an individual terminal identifier to be stored to announce the mobile station.

17. A computer program running on a programmable hardware component, the program including instructions for performing a method for influencing the selection of a frequency band for wireless communication by an apparatus with a mobile station, the method comprising:
transmission of a beacon signal at a first transmission power in the frequency band;
recognition of a connection request from a mobile station in the frequency band; and
transmission of the beacon signal at a second transmission power, which is different than the first transmission power, in response to a determination that the mobile station is unknown to the apparatus,
wherein the second transmission power in the frequency band is maintained for a prescribed time and subsequently the first transmission power is again used for sending.

* * * * *